Sept. 25, 1956      H. C. PATE      2,763,926
CUTTING DEVICE
Filed July 18, 1955      3 Sheets-Sheet 1
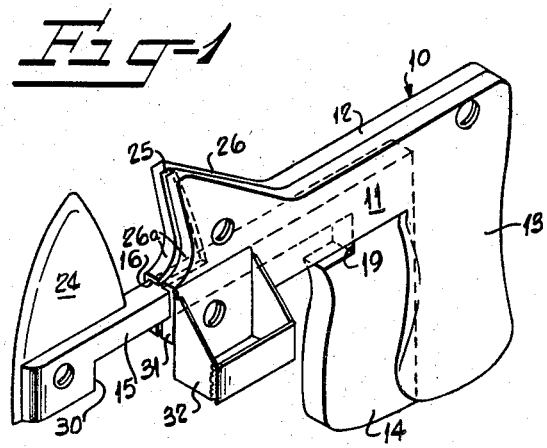
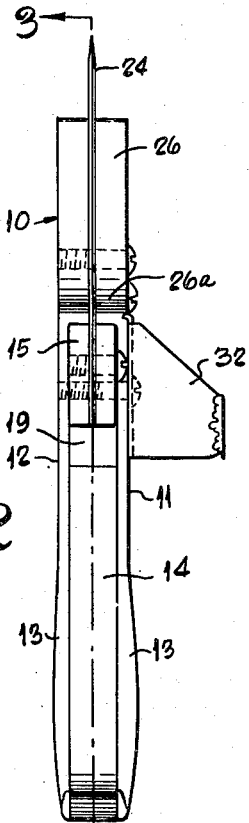
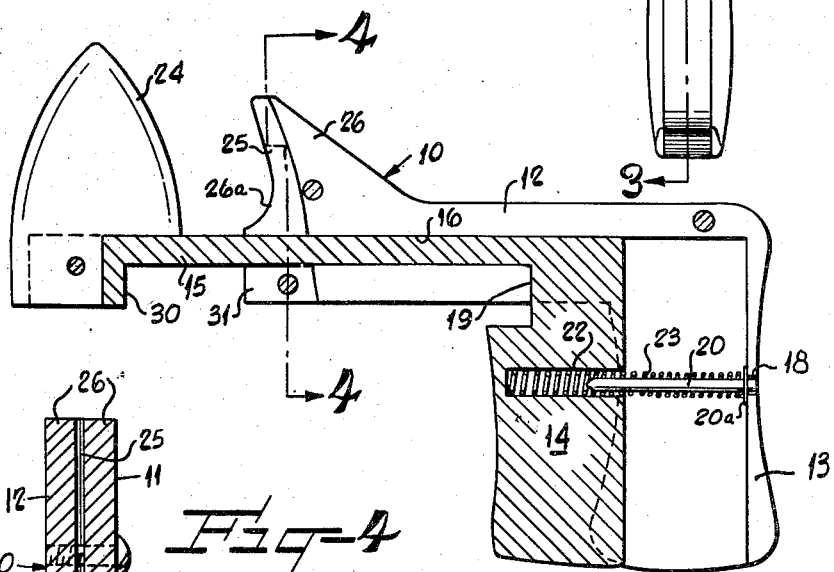
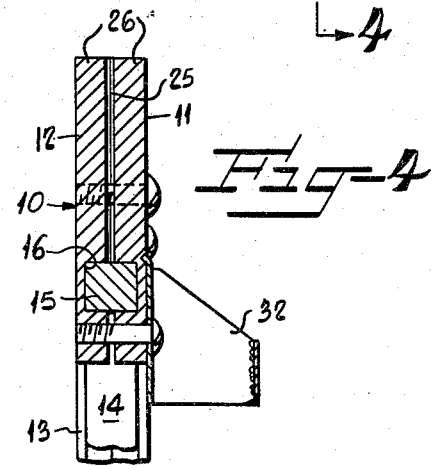
INVENTOR:
HENRY CLYDE PATE.
BY Eaton & Bell
ATTORNEYS

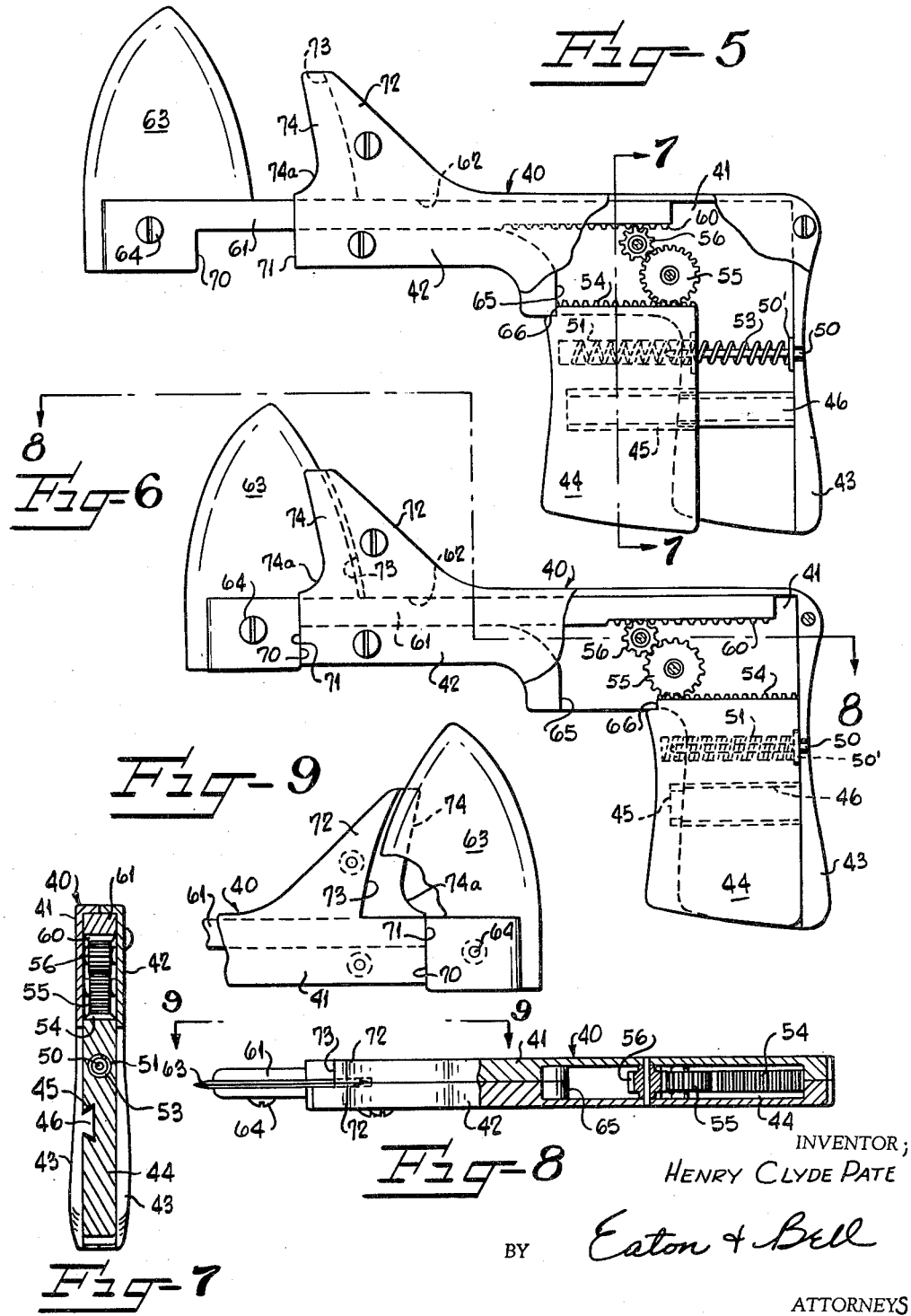

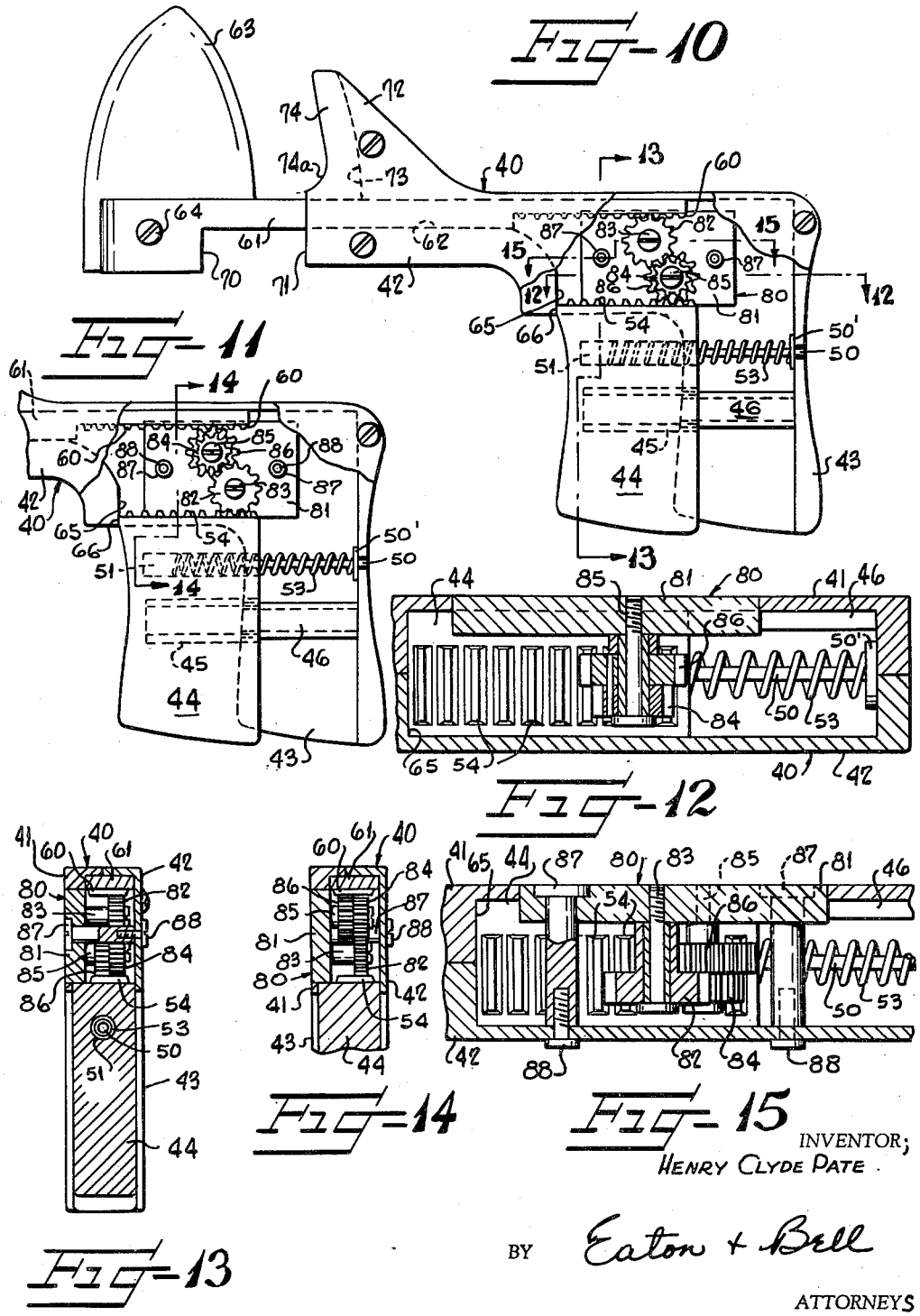

United States Patent Office 2,763,926
Patented Sept. 25, 1956

2,763,926

CUTTING DEVICE

Henry Clyde Pate, Cheraw, S. C.

Application July 18, 1955, Serial No. 522,433

14 Claims. (Cl. 30—272)

This invention relates to cutting devices and more especially to a cutting device especially designed for use in cutting the tops off of celery, the ends of corn, and for trimming shrubbery, flowers or small tree branches.

An object of my invention, therefore, is to provide an economically manufactured and simple operating cutting device which may be operated by the pulling of a trigger and which when operated severs the object being cut along a clean cutting line.

Another object of my invention is to provide a cutting device having a spring-loaded trigger normally maintaining a movable cutting blade in extended position to thus maintain the cutting blade in operative position for cutting or trimming any desired object.

It is a further object of the invention to provide a cutting device having a trigger operated movable cutting blade and a stationary cutting attachment on one side of the device for cutting windows in the ears of corn.

Some of the objects of the invention having been stated, other objects will appear as the description proceeds when taken in connection with the accompanying drawings, in which—

Figure 1 is a perspective view of one form of the cutting device in normal operative position;

Figure 2 is an enlarged end view as seen from the left end of Figure 1;

Figure 3 is a longitudinal vertical sectional view taken along line 3—3 in Figure 2, and on a reduced scale;

Figure 4 is a transverse vertical section taken along the line 4—4 in Figure 3 on an enlarged scale;

Figure 5 is a side elevation of a second form of the cutting device with parts broken away for clarity;

Figure 6 is a side elevation similar to Figure 5 with parts in a different position;

Figure 7 is a transverse vertical sectional view along line 7—7 of Figure 5;

Figure 8 is a top plan view partly in section taken along line 8—8 of Figure 6;

Figure 9 is an enlarged fragmentary side elevation taken along line 9—9 in Figure 8;

Figure 10 is a third form of the cutting device with parts broken away for clarity and showing the gears for driving the device mounted on a removable plate;

Figure 11 is a fragmentary view of Figure 10 showing the plate and gears mounted thereon in reversed position from Figure 10;

Figure 12 is a greatly enlarged horizontal section taken on line 12—12 of Figure 10;

Figure 13 is a vertical section taken on line 13—13 of Figure 10;

Figure 14 is a vertical section taken on line 14—14 of Figure 11;

Figure 15 is a greatly enlarged horizontal section taken on line 15—15 of Figure 10.

Referring more specifically to the drawings, the numeral 10 broadly indicates the body of a first form of the improved cutting device (Figures 1, 2, 3 and 4). The body 10 comprises mating side members 11, 12 suitably secured together. Each side member 11, 12 has a depending rear portion integral therewith which portions collectively form a hollow handle or grip 13. A trigger 14 is loosely mounted between the side members 11, 12 and in the handle 13. Also, an elongated bar or rod 15 is mounted for longitudinal movement in an elongated guideway or aperture 16 formed between and extending longitudinally of the side members 11, 12.

The rear end of the rod 15 is connected to the upper portion of the trigger 14 by being formed integral therewith in Figures 1 and 3. In order to normally maintain the rod 15 and trigger 14 in extended position relative to the body 10, the rear end of a rod 20 is positioned in an aperture 18 formed in the back wall of the handle 13 (Figure 3) and the forward portion of rod 20 is loosely disposed in a cavity or aperture 22 in the trigger 14. A compression spring 23, encircling rod 20, has its front end positioned in aperture 22 and its rear end bears against a flange 20a on rod 20. This flange 20a engages the back wall of handle 13 for maintaining the rod 20 in alinement with the apertures 18, 22.

The front upper portion of trigger 14 has a shoulder 19 thereon which is normally urged against an abutment defined beneath the aperture 16 for limiting outward or forward movement of the trigger 14 and rod 15 relative to the body 10. A cutting blade 24 is suitably attached to and projects upwardly from the exposed front portion of the rod 15. This blade is preferably substantially triangularly-shaped with sharp front and rear cutting edges. These cutting edges are preferably convexly curved as shown in Figures 1 and 3.

When the trigger 14 is compressed to retract the rod 15 and blade 24, the rear or inner cutting edge of blade 24 enters a groove or slot 25 provided between upstanding nose portions 26 formed integral with the front ends of the side members 11, 12 of the body 10. The outer or front edges of the nose portions 26, which may collectively be termed as a nose portion, serve as a bearing block or stationary cutting blade against which the object to be cut is positioned. It will be noted in Figure 3 that the outer or front surfaces 26a of nose portions 26 are concave to assist in retaining the object to be cut in the path of the blade 24 as it is retracted.

The outer or front end of the rod 15 has a depending portion or shoulder 30 thereon which engages a shoulder 31 defining the outer or front ends of the side members 11, 12 below the nose portions 26. The shoulder 31 determines the rearmost position of the cutting blade 24 when the same is retracted into the slot 25 by the trigger 14. It will be observed in Figure 3 that the distance between the shoulders 30 and 31 is less than the distance between the inner edge of the cutting blade 24 and the bottom of the slot 25 to prevent the blade 24 from engaging the bottom of the slot 25 and being damaged thereby.

An attachment 32 is suitably secured to a side surface of the body 10 and comprises a rectangular member, the lower edges of which are sharpened to cut a window in an ear of corn, for example, by merely exerting a rocking motion to the cutting device when applied to the side of an ear of corn.

In Figures 5 to 9 there is illustrated a second form of the invention and wherein the reference numeral 40 broadly indicates a body having side members 41 and 42 provided with a hollow handle or grip 43 formed integral therewith and between which is slidably received a trigger 44 having a transversely disposed groove 45 engaging a transversely disposed mating dove-tailed portion or rib 46 formed integral with the handle 43.

The trigger 44 is provided with a pin or rod 50 having one end extending through an aperture formed in the handle 43 with a collar or flange 50' fixedly secured thereto to prevent the pin 50 from moving outside the confines of the handle 43, and the other end of the pin 50 is received in an aperture 51 provided in the trigger 44. The pin 50 is surrounded by a compression coil spring 53 for normally maintaining the trigger 44 in extended position. It is obvious that a leaf spring may be substituted for the coil spring 53, but the coil spring is preferred since it gives a more positive movement to the trigger 44.

The trigger 44 is connected to an elongated blade-support, bar or rod 61 by a rack and pinion arrangement as shown in Figures 5 through 8. To this end, the upper edge of the trigger 44 is in the form of a rack in that it is provided with teeth 54 for engaging the teeth of a large gear 55 rotatably secured between the side members 41 and 42 and which engages a smaller gear 56 also rotatably secured between the side members 41 and 42. Teeth 60 for engaging the teeth of the gear 56 are provided on the lower edge of a rod 61 which rod is slidably mounted in an aperture or guideway 62 provided in the body 40. The outer end of the rod 61 has a cutting member or blade 63 suitably secured thereto, as by a screw 64. A single gear may be employed in lieu of the two gears for connecting the trigger 44 to the rod 61, but two gears, one larger than the other are preferred as shown in Figure 5 so the blade 63 moves in the same direction and at the same speed as the trigger 44.

A shoulder 65 is provided in the body 40 for engaging a shoulder 66 on the trigger 44 for controlling the outward position of the trigger 44 and thus controlling the extended position of the rod 61 and the blade 63. A shoulder 70 is provided on the rod 61 which may engage a shoulder 71 on the body portion 40 to control the inward position of the cutting blade 63 when the same is moved inwardly by the trigger 44. It will be observed in Figure 6 that the distance between the shoulders 70 and 71 is less than the distance between the inner edge of the cutting blade 63 and a shoulder 73 toward which the cutting blade 63 is moved by the trigger 44 to prevent the blade 63 from being damaged. Of course, inward movement of blade 63 may, alternatively, be determined by the rear edge of trigger 44 engaging the rear wall of the grip 43. This depends upon the displacement between the shoulders 70, 71 as compared to the displacement between the rear surface of the trigger 44 and the rear wall of the grip 43 when the blade 63 is in extended position as shown in Figure 5.

Instead of having a slot, such as slot 25 (Figure 1) for receiving the rear edge of blade 63, the side members 41, 42 each has an upstanding nose portion 72 thereon and the nose portion 72 of side member 41 is cut away or recessed at 73 (Figures 8 and 9) to define a shoulder or projection 74 on the nose portion 72 of side member 42. Thus, the projection 74 serves as a bearing block or stationary cutting blade. The shoulder 74 is provided with a concave portion 74a to maintain the object being cut in the path of the blade 63 and to prevent the object from moving upwardly. The omission of a slot in the nose 72 has been found to prevent the hanging or wedging of the cutting blade 63 therein during a cutting operation and to allow the compression spring 53 provided for the trigger 44 to return the cutting blade 63 to its normal outward position after an object has been cut.

It will be observed that the second form of the invention shown in Figures 5 to 9 mainly differs over the first form of the invention shown in Figures 1 through 4 by a smoother trigger actuating mechanism for moving the cutting blade faster and by the omission of a slot for receiving the cutting blade and the omission of the cutting attachment for cutting windows in an ear of corn.

In Figures 10 through 15 there is illustrated another or third form of the invention and wherein parts which are substantially the same as those associated with the second form of the invention shown in Figures 5 to 9 shall bear the same reference numerals. In the third form of the invention, a gear assembly broadly indicated at 80 is provided for connecting the trigger 44 of the device to the rod 61. The gear assembly 80 comprises a mounting plate 81 having a large gear 82 rotatably mounted thereon on a shaft 83 and a small gear 84 meshing therewith and mounted on a shaft 85, also secured to the plate 81. The shafts 83 and 85 are preferably non-rotatably secured to the mounting plate 81 so as to be readily removed with the same. A large gear 86, secured to the small gear 84, is also mounted on the shaft 85 for meshing with the teeth 54 of the trigger 44. Suitable securing means such as a pair of bolts 87 are provided for securing the plate 81 in a corresponding opening formed in the side member 41 of the body 40. The bolts or screws 87 are threaded internally to receive locking screws 88 which loosely penetrate the opposite wall of member 42.

It will be observed in Figures 10, 12, 13 and 15 that the mounting plate 81 is positioned with the shaft 85 below the shaft 83 so that, with a movement of the trigger 44, the teeth 54 thereof will mesh with the teeth of the large gear 86 and drive the large gear 82 meshing with the teeth 60 on the rod 61 through the small gear 84 to drive the cutting blade 63 at a slower speed than the speed at which the trigger is moved to thus obtain a mechanical advantage to enable the trigger to move the blade 63 with a less amount of force.

In Figures 11 and 14 the mounting plate 81 has been reversed or inverted from the position shown in Figure 10 to obtain a faster movement of the cutting blade 63 than the movement of the trigger 44. In this position of the mounting plate 81, the shaft 83 carrying the large gear 82 is positioned below the shaft 85 carrying the small gear 84 and the large gear 86 thereon.

The gears 82 and 86 are preferably of the same size, so as to mesh properly with the teeth 54 on the trigger 44 and the teeth 60 on the rod 61 when the mounting plate 81 is reversed from the position shown in Figure 10 to the position shown in Figure 11. The teeth 54 and 60 on the trigger 44 and the rod 61 have a width of substantially twice the thickness of any one of the gears 82, 86 to permit proper engagement of the gears therewith whether in the position shown in Figure 10 or Figure 11.

Accordingly, this form of the invention shown in Figures 10 to 15 differs over the second form of the invention shown in Figures 5 to 9 by the employment of a gear assembly or unit which may be employed in one position to obtain a mechanical advantage and in another position to obtain a greater speed for the blade 63.

In all forms of the invention, the cutting blade positioned on the end of the sliding rod is shown as being of a greater height than the portion of the body within which it is received to permit the extending edges of the cutting blade to be used as a knife. Also, the outer edge as well as the inner edge of the cutting blade are shown as being sharpened to permit the cutting device to be used as a chopper, for example, to cut objects lying on a table by moving the outer edge of the cutting blade thereagainst.

In normal operation, the object to be cut is positioned between the inner edge of the cutting blade and the upturned nose on the body and the trigger is moved rearwardly to move the cutting blade against the object to sever the same. It will be observed in all forms of the invention that the upturned nose on the body has a concave portion to facilitate the retention of the object to be cut in the path of the cutting blade.

In the drawings and specification there have been set forth several embodiments of the invention and, although specific terms are employed, they are used in a generic and descriptive sense only and not for purposes of limitation, the scope of the invention being defined in the claims.

I claim:

1. A cutting device comprising a body portion, a hollow handle connected to said body portion, a rod slidably mounted in said body portion, a cutting blade positioned on the outer end of said rod, means for normally maintaining said cutting blade in spaced relation to said body portion, a trigger operatively connected to said rod, and means provided on the inner surface of said handle for engaging said trigger and slidably guiding the same in a path of travel substantially parallel to said rod whereby, upon said trigger being moved rearwardly, said cutting blade will be moved toward said body portion to sever the object being cut therebetween.

2. A cutting device comprising a body portion, a hollow handle connected to said body portion, a transversely disposed rib provided on the inner surface of said handle, a rod slidably mounted in said body portion and extending outwardly therefrom, a cutting member positioned on the outer end of said rod, means for normally maintaining said cutting member in spaced relation to said body portion, a trigger mounted for sliding movement on said rib in a path of travel substantially parallel to said rod, and means operatively connecting said trigger with said rod whereby, upon said trigger being moved rearwardly, said cutting member will be retracted toward said body portion to sever the object being cut therebetween.

3. A device according to claim 2 wherein said means connecting said trigger with said rod comprises teeth on the upper edge of said trigger and the bottom edge of said rod and at least one gear rotatably mounted in said body operatively connecting the teeth on said trigger with the teeth of said rod.

4. A cutting device comprising a body portion, a hollow handle connected to said body portion and having an open front and bottom end, cutting means, means for slidably connecting said cutting means with said body portion, resilient means for normally maintaining said cutting means in extended position outside the confines of said body portion, a trigger positioned in said handle and operatively connected to said cutting means for moving the cutting means rearwardly toward said body portion upon rearward movement being imparted to said trigger, and means on the inner surface of said handle for engaging said trigger to prevent the trigger from falling out of the handle and to slidably guide the trigger in a path of travel substantially parallel to the path of travel of said cutting means.

5. A device according to claim 4 wherein said resilient means for normally maintaining said cutting means in extended position relative to said body portion comprises a spring having one end resting against the inner surface of the handle and the other end resting against a portion of the trigger.

6. A device according to claim 5 wherein said resilient means is a coiled spring and the rear portion of the trigger is provided with an aperture to receive said other end of the spring.

7. A cutting device comprising a body portion having side walls, a rod slidably mounted in said body portion and having a portion extending forwardly beyond the body portion, a cutting member positioned on the outer end of said rod extending beyond the body portion, means for normally maintaining said rod and said cutting member in extended position, a trigger, said rod and said trigger having teeth provided on their proximal surfaces, and means operatively connecting the teeth of said trigger with the teeth of said rod whereby, upon rearward movement of the trigger, the cutting member is moved toward the body portion.

8. A device according to claim 7 wherein said means operatively connecting the teeth of said trigger with the teeth of said rod comprises a large gear engaging the teeth of said trigger, and a small gear meshing with said large gear and the teeth of the rod whereby, upon rearward movement of the trigger, the cutting member will be moved rearwardly at a faster speed than the trigger.

9. A device according to claim 7 wherein said means operatively connecting the teeth of said trigger with the teeth of said rod comprises a gear assembly.

10. A device according to claim 9 wherein said gear assembly comprises a mounting plate, means for securing the mounting plate to one of the side walls of the body, a pair of spaced shafts carried by said plate, one of said shafts rotatably carrying a large gear, the other shaft rotatably carrying a large and small gear, one of said large gears meshing with the teeth of said trigger, the other large gear meshing with the teeth of said rod, and a small gear meshing with the large gear on the adjacent shaft.

11. A device according to claim 10 wherein said mounting plate is positioned in one of the side walls of the body portion, whereby the plate may readily be removed and inverted to change from a mechanical advantage drive to an increase in speed drive.

12. A device according to claim 10 wherein said other shaft carrying the large and small gear is positioned below said one shaft carrying the large gear, and the large gear on said other shaft meshes with the teeth on the trigger whereby the trigger may be moved rearwardly to move the cutting member positioned thereon with a mechanical advantage.

13. A device according to claim 10 wherein said other shaft carrying the large and small gear is positioned above said one shaft carrying the large gear, and the large gear on said one shaft meshes with the teeth on the trigger whereby, upon rearward movement of the trigger, the cutting member will be moved rearwardly at a faster speed than the trigger.

14. A cutting device comprising a body portion, a rod slidably mounted in said body portion, a cutting member positioned on the outer end of said rod, means for normally maintaining said rod and said cutting member in extended position relative to said body portion, a trigger, and connecting means operatively connecting said trigger with said rod, said connecting means comprising teeth on the upper edge of said trigger and the bottom edge of said rod, and at least one gear rotatably mounted in said body portion operatively connecting the teeth on said trigger with the teeth on said rod whereby, upon said trigger being moved rearwardly, said cutting member will move toward said body portion to sever the object to be cut therebetween.

References Cited in the file of this patent

UNITED STATES PATENTS

| 278,108 | Drake | May 22, 1883 |
| 460,903 | Woodward | Oct. 6, 1891 |
| 1,197,430 | Barnes et al. | Sept. 5, 1916 |
| 2,533,962 | Rowe et al. | Dec. 12, 1950 |